United States Patent
Shen et al.

(10) Patent No.: US 9,843,210 B2
(45) Date of Patent: Dec. 12, 2017

(54) METHOD FOR TRANSMITTING DATA AND WIRELESS CHARGER FOR IMPLEMENTING SAME

(71) Applicant: Silergy Semiconductor Technology (Hangzhou) Ltd., Hangzhou, Zhejiang (CN)

(72) Inventors: Xuzhen Shen, Zhejiang (CN); Lingdong Zhang, Zhejiang (CN)

(73) Assignee: Silergy Semiconductor Technology (Hangzhou) Ltd., Hangzhou (CN)

(*) Notice: Subject to any disclaimer, the term of this patent is extended or adjusted under 35 U.S.C. 154(b) by 129 days.

(21) Appl. No.: 14/547,414

(22) Filed: Nov. 19, 2014

(65) Prior Publication Data
US 2015/0145473 A1 May 28, 2015

(30) Foreign Application Priority Data
Nov. 22, 2013 (CN) .......................... 2013 1 0601137

(51) Int. Cl.
*H02J 7/00* (2006.01)
*H04B 5/00* (2006.01)
*H02J 7/02* (2016.01)

(52) U.S. Cl.
CPC ............ *H02J 7/007* (2013.01); *H04B 5/0031* (2013.01); *H04B 5/0037* (2013.01); *H04B 5/0093* (2013.01); *H02J 7/025* (2013.01); *H02J 2007/0096* (2013.01)

(58) Field of Classification Search
CPC ..... H02J 7/007; H02J 7/025; H02J 2007/0096
USPC .................................. 320/108, 134, 137, 141
See application file for complete search history.

(56) References Cited

U.S. PATENT DOCUMENTS

| | | | |
|---|---|---|---|
| 2013/0039395 A1* | 2/2013 | Norconk | H04B 5/0031 375/219 |
| 2013/0127407 A1 | 5/2013 | Kao | |
| 2013/0140906 A1 | 6/2013 | Tanabe | |

FOREIGN PATENT DOCUMENTS

| | | |
|---|---|---|
| CN | 102386893 | 3/2012 |
| CN | 102035555 | 12/2012 |
| CN | 103138358 | 6/2013 |
| CN | 103269163 | 8/2013 |
| CN | 103476184 | 12/2013 |
| CN | 103857152 | 6/2014 |

* cited by examiner

*Primary Examiner* — Edward Tso
*Assistant Examiner* — Aaron Piggush
(74) *Attorney, Agent, or Firm* — Beyer Law Group LLP

(57) ABSTRACT

A method for transmitting data and a wireless charging equipment using the same are disclosed. When the wireless charger transmits data, an output current of the wireless charger is controlled at a preset current value so that there is a higher variation in amplitude of a current or a voltage on an inductive element to thereby enable a signal receiver to demodulate the signal. At the end of data transmission, the output current is resumed consistent with a driving current of the load at the moment. The present disclosure can address the problem of impossible normal communication in the wireless charger at the circumstance of a very low driving current of the load without any increase in cost and complexity of the circuit.

14 Claims, 3 Drawing Sheets

METHOD FOR TRANSMITTING DATA AND WIRELESS CHARGER FOR IMPLEMENTING SAME

CLAIM OF PRIORITY AND CROSS-REFERENCE TO RELATED APPLICATION(S)

This application claims the benefit of Chinese Patent Application No. 201310601137.8, filed on Nov. 22, 2013, which is incorporated herein by reference in its entirety.

BACKGROUND OF THE INVENTION

1. Field of the Invention

The present invention relates to the field of power electronics, and particularly to a method for transmitting data and a wireless charger for implementing the same.

2. Description of the Related Art

Wireless charging has been widely applied in the field of electronic products, particularly low power electronic products, e.g., mobile phones, MP3 players, digital cameras, portable computers, etc., due to its convenience and practicality. A wireless charger in the prior art typically comprises a transformer composed of primary winding L1 and secondary winding L2, and the wireless charger typically transmits power from a transmitter to a receiver through coupling over a magnetic field between the primary and secondary windings of the transformer. Along with rapid development of wireless charging, how to communicate data wirelessly over the same wireless charger has become a current hot issue under investigation, and an existing solution is typically to modulate the amplitude of current or voltage on an inductive element of a data signal transmitter and to transmit data, and through coupling over a magnetic field, a data signal receiver demodulates the inductive signal on an inductive element into the data signal transmitted thereto, so that the data communication is achieved by the wireless charger.

In the above-mentioned data transmission process, variation $\Delta I$ in amplitude of the current on the inductive element has a considerable influence upon the demodulation, and as illustrated in FIG. 1, there is a significant variation $\Delta I_H$ in amplitude of the current on the inductive element (e.g., the primary and secondary windings of the transformer) at moment t1 so that the signal is easy to demodulate, whereas the output current of the wireless charger is lower at moment t3 with lower driving current after charging for a long period of time and accordingly there is a lower variation $\Delta I_L$ in amplitude of the current on the inductive element so that the signal is difficult to demodulate at the data receiver. When the load current is initially low as represented by waveform I' in FIG. 1, variation $\Delta I_H$ in amplitude of the current on the inductive element is at a very low level at moment t1, and the data signal is difficult to demodulate at the data receiver; and variation $\Delta I_L$ in amplitude of the current on the inductive element has become almost absent at moment t3 so that the demodulation may be failed at the data receiver, and consequently, a more sophisticated and expensive circuit has to be implemented for the demodulation.

BRIEF DESCRIPTION OF THE INVENTION

In view of this, the present disclosure provides a method for transmitting data in a wireless charger, wherein when the wireless charger starts to transmit data, output current thereof is controlled at a preset current value so that there is a higher variation in amplitude of a current on an inductive element to thereby enable a signal receiver to demodulate the signal smoothly; and at the end of data transmission, the output current is resumed consistent with a driving current of the load at the moment.

According to one aspect of the present disclosure, there is provided a method for transmitting data in a wireless charger configured to power a load, the method comprising: modulating an electric parameter on a first inductive element in accordance with a data signal to be transmitted to obtain a first signal characterizing the data signal; sensing the first signal to generate a second signal on a second inductive element; and demodulating the second signal to obtain the data signal transmitted thereto. During data transmission, an output current of the wireless charger is set at a preset current value; until the end of data transmission the output current is resumed consistent with a driving current of the load.

Preferably, modulating the electric parameter on the first inductive element in accordance with the data signal to be transmitted comprises: cutting off power to the load on each rising edge of the data signal; and conducting the power to the load on each falling edge of the data signal.

Preferably, the electric parameter is a current, the first signal and the second signal are both current signals.

Preferably, the electric parameter is a voltage, the first signal and the second signal are both voltage signals.

Preferably, the second signal is demodulated by means of demodulating the amplitude of the second signal.

Preferably, the first inductive element and the second inductive element are two windings of a transformer.

Preferably, the first inductive element is a secondary winding of the transformer, and the second inductive element is a primary winding of the transformer.

According to another aspect of the present disclosure, there is provided a wireless charger configured to power a load, comprising: a signal transmitter configured to modulate an electric parameter on a first inductive element in accordance with a data signal to be transmitted to obtain a first signal characterizing the data signal; a signal receiver configured to sense the first current signal to generate a second signal on a second inductive element and to demodulate the second signal to obtain the data signal transmitted thereto. During data transmission between the signal transmitter and the signal receiver, an output current of the wireless charger is set at a preset current value. Until the end of data transmission the output current is resumed consistent with a driving current of the load.

In accordance with the abovementioned method for transmitting data in a wireless charger, when the wireless charger starts to transmit data for communication, the output current of the wireless charger is controlled at a preset current value. Particularly when the current for the load is at a low level, by boosting the output current actively, a higher variation in amplitude of the current (or voltage) on the inductive element is achieved so that the data signal can be demodulated by the data receiver; and the output current is resumed consistent with a driving current of the load at the moment at the end of data transmission. The present disclosure can address the problem that the wireless charger could not achieve normal communication at the circumstance of a very low driving current of the load without any increase in cost and complexity of the circuit. Since the wireless charger typically communicates intermittently, that is, it is inoperative for a long period of time after transmitting some data, so the output current is boosted only for data communication but is not boosted significantly for the long period of time, where there is no influence upon the charging characteristic of the circuit.

DETAILED DESCRIPTION OF EMBODIMENTS OF THE INVENTION

Several preferred embodiments of the present disclosure will be described in detail in conjunction with the accompanying drawings as follows, however, the present disclosure is intended to encompass any substitutions, modifications, equivalents, etc., made thereto without departing from the spirit and scope of the present disclosure. In order to provide those skilled in the art with thorough understanding of the present disclosure, particular details will be described below in the preferred embodiments of the present disclosure, although those skilled in the art can understand the present disclosure without the description of these details.

Figure 1:
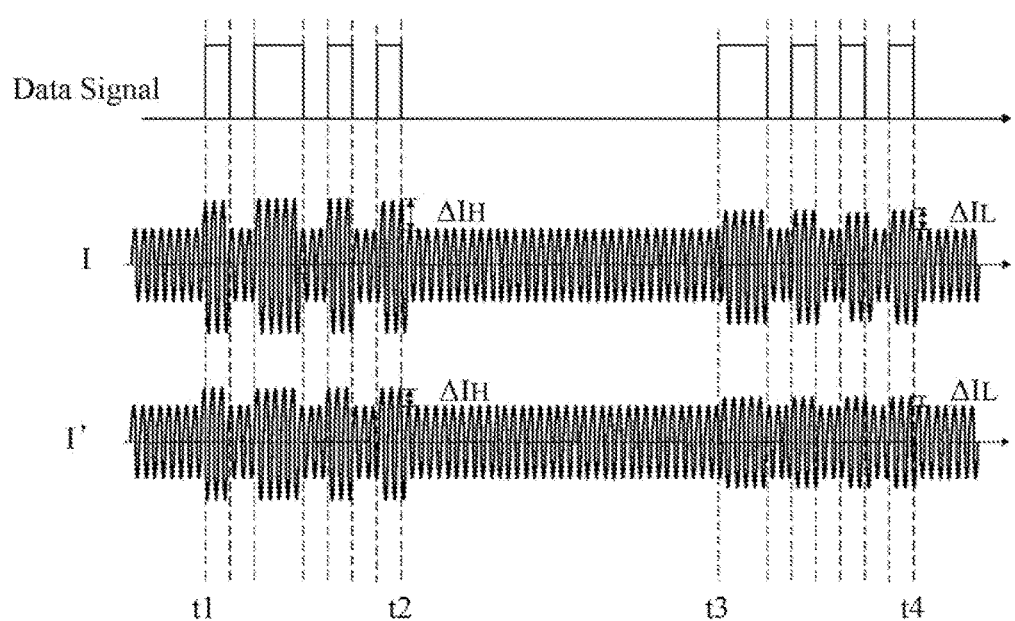
FIG. 1 is an operating waveform diagram during data transmission in the prior art.
Figure 2:
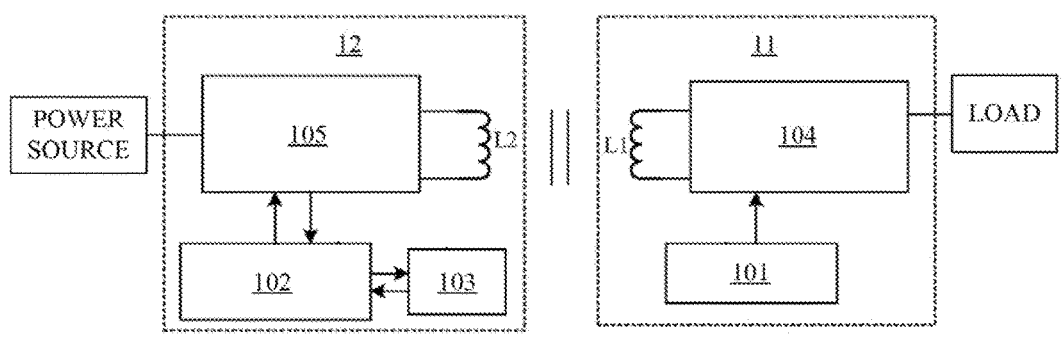
FIG. 2 is a block diagram of a wireless charger according to one embodiment of the present disclosure.

One embodiment of the present disclosure discloses a wireless charger configured to power a load, and it shall be noted that the wireless charger according to this embodiment can wirelessly communicate data over itself. A particular implementation of the wireless charger capable of wireless data communication will be described below in details. As illustrated in FIG. 2, there is a wireless charger according to one embodiment of the present disclosure, the wireless charger comprises signal transmitter 11 and signal receiver 12, wherein signal transmitter 11 comprises secondary control circuit 101, secondary synchronous rectifier 104 and secondary inductor L1; and signal receiver 12 comprises digital circuit 103, primary control circuit 102, primary full-bridge switch circuit 105 and primary inductor L2. Secondary inductor L1 and primary inductor L2 are two windings of a transformer.

When signal transmitter 11 receives a data signal to be transmitted, for example, which may be generated by secondary control circuit 101, thereafter secondary control circuit 101 turns on and off the switches in secondary synchronous rectifier 104 in accordance with the data signal to be transmitted to thereby modulate a current signal on the inductive element (secondary inductor L1), so that first current signal $I_{L1}$ characterizing the data signal is generated. Particularly, power to the load is cut off on each rising edge of the data signal, and power to the load is conducted on each falling edge of the data signal, so that there is a correspondence between a variation in amplitude of the current on secondary inductor L1 and the data signal. Therefore, first current signal $I_{L1}$ may characterize the data signal.

Then, the inductive element (primary inductor L2) in signal receiver 12 senses first current signal $I_{L1}$ to obtain second current signal $I_{L2}$ which may also characterize the data signal, and primary control circuit 102 and digital circuit 103 demodulate second current signal $I_{L2}$ to obtain the data signal transmitted thereto.

During data transmission between signal transmitter 11 and signal receiver 12, an output current of the wireless charger is set at a preset current value. Until the end of data transmission, the output current is resumed consistent with a driving current of the load at the moment.

In addition, with a relationship between the output current and the inductor current in the wireless charger, the inductor current is at a lower level with the higher output current; and the inductor current is at a higher level with the lower output current. As can be apparent from the abovementioned process of data transmission, the variation in amplitude of current on the inductor is at a low level with a high current on the inductor, so the preset current value should equal to such value that the variation in amplitude on the inductive element could suffice the demodulation.

Figure 3:
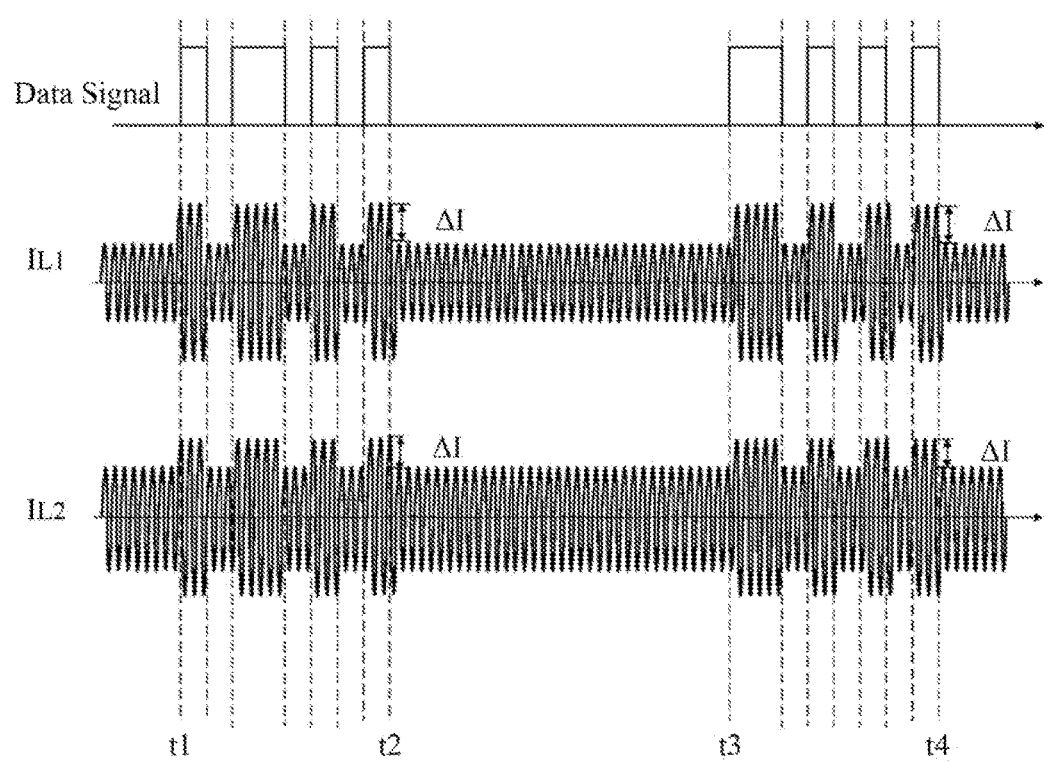
FIG. 3 is an operating waveform diagram during data transmission according to the embodiment of the present disclosure.

An operation process of this implementation will be described below with reference to an operating waveform diagram of data transmission according to one embodiment of the present disclosure illustrated in FIG. 3: at moment t1, the digital signal starts to be transmitted where signal transmitter 12 cuts off power to the load, and the current on secondary inductor L1 rises, and thereafter power to the load is controlled sequentially in accordance with the data signal at high and low levels until moment t2 where data transmission is finished for the first time. By such operation, the variation in amplitude of the current on secondary inductor L1 can correspond to the data signal, and the current signal on secondary inductor L1 is first current signal $I_{L1}$. Primary inductor L2 senses the first current signal to generate second current signal $I_{L2}$ varying in amplitude consistent with first current signal $I_{L1}$, which characterizes the information of the data signal. During data transmission, the output current is set at a preset current value so that the variation in amplitude of the first current signal (or the second current signal) is a constant difference, as represented by ΔI in FIG. 3, thus the signal receiver can demodulate the signal smoothly. The output current is resumed consistent with a driving current of the load at the moment at the end of data transmission. At moment t3, the data signal arrives for the second time, and since the driving current of the load may become lower after charging for a long period of time, from the moment on, the output current is set at the preset current value during data transmission so that the variation in amplitude of the first current signal (or the second current signal) is the constant difference, and the signal receiver could demodulate the signal smoothly until data transmission is finished for the second time at moment t4. And then, the output current is resumed consistent with a driving current of the load at the moment.

As can be apparent, during data transmission in accordance with the embodiment of the present disclosure, the output current is controlled at an appropriate preset current value so that demodulation can be accommodated by the variation in amplitude of the current on the inductor, which leads to a successful demodulation. Embodiments of the present disclosure are particularly suitable for the circumstance that the driving current of the load is at a low level. Preferably, when the driving current of the load is at a high level, the output current may not be adjusted in magnitude, that is, the output current is at the driving current value corresponding to the load. Until the output current drops below the preset current value the output current is controlled at the preset current value.

One embodiment of the present disclosure further discloses a method for transmitting data in a wireless charger configured to power a load, and the wireless charger comprises a signal transmitter and a signal receiver, wherein the method comprises the following steps: a current signal on an inductive element in the signal transmitter is modulated in accordance with a data signal to be transmitted so that a first current signal characterizing the data signal is generated; an inductive element in the signal receiver senses the first current signal to generated a second current signal; and the second current signal is demodulated to obtain the data signal transmitted thereto.

During data transmission between the signal transmitter and the signal receiver, output current of the wireless charger is set at a preset current value. Until the end of data transmission the output current is resumed consistent with a driving current of the load at the moment.

In summary, when the wireless charger in accordance with the embodiment of the present disclosure starts to transmit data for communication, the output current is set at the preset current value. Particularly, when the current for the load is at a low level, by boosting the output current actively, a higher variation in amplitude of the current on the inductive element is achieved so that the data signal can be demodulated by the data receiver; and the output current is resumed consistent with a driving current of the load at the moment at the end of data transmission. The present disclosure can address the problem that the wireless charger could not achieve normal communication at the circumstance of a very low driving current of the load without any increase in cost and complexity of the circuit. Since the wireless charger typically communicates intermittently, that is, it is inoperative for a long period of time after transmitting some data, so the output current is boosted only for data communication but is not boosted significantly for the long period of time, where there is no influence upon the charging characteristic of the circuit.

In addition, in the embodiment of the present disclosure, the inductor current on the inductive element, e.g., windings L1 and L2, is controlled to obtain the information characterizing the data signal to be transmitted, and in light of the technical solution of the present invention, a voltage signal on the inductive element may be controlled for data transmission, for example, a variation in amplitude of the voltage signal on the inductive element is controlled at a constant difference, and the data receiver demodulates the sensed voltage signal to thereby obtain the data signal transmitted thereto.

The method for transmitting data and the wireless charger implementing the same in accordance with the preferred embodiments of the present disclosure have been described above in details, and those skilled in the art can derive therefrom other technologies or topologies and circuit layouts, elements, etc., which are applicable to the embodiments of the present disclosure.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is intended that the scope of the present disclosure be defined by the claims appended hereto and their equivalents.

We claim:

1. A method for transmitting data in a wireless charger configured to power a load, said method comprising:

modulating an electric parameter on a first inductive element by cutting off power from said first inductive element to said load and providing power from said first inductive element to said load in accordance with a data signal to be transmitted, thereby obtaining a first signal characterizing said data signal with a pattern of said cutting off and providing of the power;

sensing said first signal at a second inductive element to generate a second signal on the second inductive element; and demodulating said second signal to obtain said data signal transmitted thereto;

wherein during data transmission, an output current of said wireless charger is set at a preset current value, and at the end of data transmission said output current is resumed consistent with a driving current of said load.

2. The method for transmitting data according to claim 1, wherein modulating said electric parameter on said first inductive element in accordance with said data signal to be transmitted comprises:

cutting off power to said load on each rising edge of said data signal; and providing the power to said load on each falling edge of said data signal.

3. The method for transmitting data according to claim 1, wherein said electric parameter is a current, said first signal and said second signal are both current signals.

4. The method for transmitting data according to claim 1, wherein said electric parameter is a voltage, said first signal and said second signal are both voltage signals.

5. The method for transmitting data according to claim 1, wherein said second signal is demodulated by means of demodulating the amplitude of said second signal.

6. The method for transmitting data according to claim 1, wherein said first inductive element and said second inductive element are two windings of a transformer.

7. The method for transmitting data according to claim 6, wherein said first inductive element is a secondary winding of said transformer, and said second inductive element is a primary winding of said transformer.

8. A wireless charger configured to power a load, comprising:

a signal transmitter configured to modulate an electric parameter on a first inductive element by cutting off power from said first inductive element to said load and providing power from said first inductive element to said load in accordance with a data signal to be transmitted, thereby obtaining a first signal characterizing said data signal with a pattern of said cutting off and providing of the power; and a signal receiver configured to sense said first current signal at a second inductive element to generate a second signal on the second inductive element and to demodulate said second signal to obtain said data signal transmitted thereto;

wherein during data transmission between said signal transmitter and said signal receiver, output current of said wireless charger is set at a preset current value, and at the end of data transmission said output current is resumed consistent with a driving current of said load.

9. The wireless charger according to claim 8, wherein said signal transmitter is configured to modulate said electric parameter on said first inductive element by means of cutting off power to said load on each rising edge of said data signal and providing power to said load on each falling edge of said data signal.

10. The wireless charger according to claim 8, wherein said electric parameter is a current, said first signal and said second signal are both current signals.

11. The wireless charger according to claim 8, wherein said electric parameter is a voltage, said first signal and said second signal are both voltage signals.

12. The wireless charger according to claim 8, wherein said signal receiver is configured to demodulate said second signal by means of demodulating the amplitude of said second signal.

13. The wireless charger according to claim 8, wherein said first inductive element and said second inductive element are two windings of a transformer.

14. The wireless charger according to claim 13, wherein said first inductive element is a secondary winding of said transformer, and said second inductive element is a primary winding of said transformer.

\* \* \* \* \*